United States Patent
Anderson

(10) Patent No.: US 9,315,221 B1
(45) Date of Patent: Apr. 19, 2016

(54) MULTI-PURPOSE TAILGATE

(71) Applicant: GM GLOBAL TECHNOLOGY OPERATIONS LLC, Detroit, MI (US)

(72) Inventor: Scott C. Anderson, Commerce Township, MI (US)

(73) Assignee: GM Global TEchnology Operations LLC, Detroit, MI (US)

( * ) Notice: Subject to any disclaimer, the term of this patent is extended or adjusted under 35 U.S.C. 154(b) by 0 days.

(21) Appl. No.: 14/640,872

(22) Filed: Mar. 6, 2015

(51) Int. Cl.
*B62D 33/03* (2006.01)
*B62D 33/08* (2006.01)
*B62D 33/027* (2006.01)
*B62D 33/037* (2006.01)

(52) U.S. Cl.
CPC ............ *B62D 33/08* (2013.01); *B62D 33/0273* (2013.01); *B62D 33/037* (2013.01)

(58) Field of Classification Search
CPC ...... B62D 33/0273; B62D 33/037; B60P 3/40
USPC .............................. 296/57.1, 26.11
See application file for complete search history.

(56) References Cited

U.S. PATENT DOCUMENTS

| | | | | |
|---|---|---|---|---|
| 5,735,567 | A * | 4/1998 | Mora, Sr. ................... | 296/180.1 |
| 6,588,822 | B1 * | 7/2003 | Duvall, Jr. .................... | 296/57.1 |
| 6,941,655 | B1 * | 9/2005 | Bisland ........................ | 29/897.2 |
| 7,201,424 | B1 * | 4/2007 | Fournier ...................... | 296/57.1 |
| 2002/0121794 | A1 * | 9/2002 | Vejnar ............... | 296/50 |
| 2007/0236034 | A1 * | 10/2007 | Stewart et al. ............... | 296/26.1 |
| 2008/0048465 | A1 * | 2/2008 | Hawley ........................ | 296/26.11 |
| 2012/0126564 | A1 * | 5/2012 | Hausler et al. .................. | 296/62 |
| 2013/0038081 | A1 * | 2/2013 | Kerr, III ....................... | 296/57.1 |

* cited by examiner

*Primary Examiner* — H Gutman
(74) *Attorney, Agent, or Firm* — Quinn Law Group, PLLC

(57) ABSTRACT

A vehicle includes a vehicle body and a storage compartment defined by the vehicle body and having a storage compartment length. The vehicle also includes a tailgate operatively connected to the vehicle body and configured to selectively expand and restrict access to the storage compartment. The vehicle additionally includes a pivotable section configured to selectively retract into and deploy out of the tailgate. In the state when the pivotable section is deployed out of the tailgate and when the tailgate restricts access to the storage compartment, the pivotable section operates to reduce aerodynamic drag on the vehicle body. Also, when the pivotable section is deployed out of the tailgate and when the tailgate expands access to the storage compartment, the pivotable section operates as a stop for cargo having a cargo length greater than the storage compartment length.

18 Claims, 3 Drawing Sheets

MULTI-PURPOSE TAILGATE

TECHNICAL FIELD

The present disclosure relates to a multi-purpose tailgate of a motor vehicle.

BACKGROUND

Motor vehicles frequently employ storage compartments for carrying personal belongings of the vehicle's passengers and cargo. A pickup truck is a light-duty motor vehicle with an open-top, rear storage compartment that is otherwise known as a bed. Typically, a pickup truck employs a closure panel or tailgate to close off the bed for retaining cargo therein. Such a tailgate may be pivotably attached to the bed for enhanced utility and convenience.

SUMMARY

A vehicle includes a vehicle body and a storage compartment defined by the vehicle body and having a storage compartment length. The vehicle also includes a tailgate operatively connected to the vehicle body and configured to selectively expand and restrict access to the storage compartment. The vehicle additionally includes a pivotable section configured to selectively retract into and deploy out of the tailgate. In the state when the pivotable section is deployed out of the tailgate and when the tailgate restricts access to the storage compartment, i.e., the tailgate is closed, the pivotable section operates to reduce aerodynamic drag on the vehicle body. Also, when the pivotable section is deployed out of the tailgate and when the tailgate expands access to the storage compartment, i.e., the tailgate is at least partially open, the pivotable section operates as a stop for cargo having a cargo length greater than the storage compartment length.

The vehicle may also include a latching mechanism configured to secure the pivotable section when the pivotable section is retracted into the tailgate.

The vehicle may additionally include a motor configured to selectively retract the pivotable section into and deploy the pivotable section out of the tailgate.

The vehicle may also include a controller configured to selectively latch and unlatch the latching mechanism and regulate the motor to selectively retract the pivotable section into and deploy the pivotable section out of the tailgate.

The vehicle may additionally include a first sensor configured to detect a speed of the vehicle and a second sensor configured to detect a position of the tailgate. In such a case, each of the first and second sensors may be configured to communicate with the controller, while the controller may be configured to selectively latch and unlatch the latching mechanism and regulate the motor in response to the detected vehicle speed and the detected position of the tailgate.

The vehicle may also include a switch configured to unlatch the latching mechanism to thereby deploy the pivotable section out of the tailgate. Such a switch may be positioned in a passenger compartment of the vehicle.

The vehicle may additionally include a spring configured to urge the pivotable section to deploy out of the tailgate. The spring may be attached to the tailgate.

The tailgate may define a first recess configured to accept the pivotable section when the pivotable section is retracted into the tailgate.

The pivotable section may include a reflector configured to reflect a beam of light for signaling operators of other vehicles that the tailgate is open and that cargo having a cargo length greater than the storage compartment length may be on board the vehicle.

The vehicle body may be positioned in a first plane and the tailgate may be positioned in a second plane that is perpendicular to the first plane when the tailgate restricts access to the storage compartment. Additionally, when the pivotable section is deployed out of the tailgate, the pivotable section may be positioned in a third plane that is parallel to the first plane.

The tailgate may include a selectively deployable and retractable seatback and define a second recess configured to house the seatback when the seatback is retracted.

The second recess may define a shape of a seat bottom complementary to the deployable seatback.

Each of the pivotable section and the selectively deployable and retractable seatback may be constructed from one of a plastic and a composite material.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
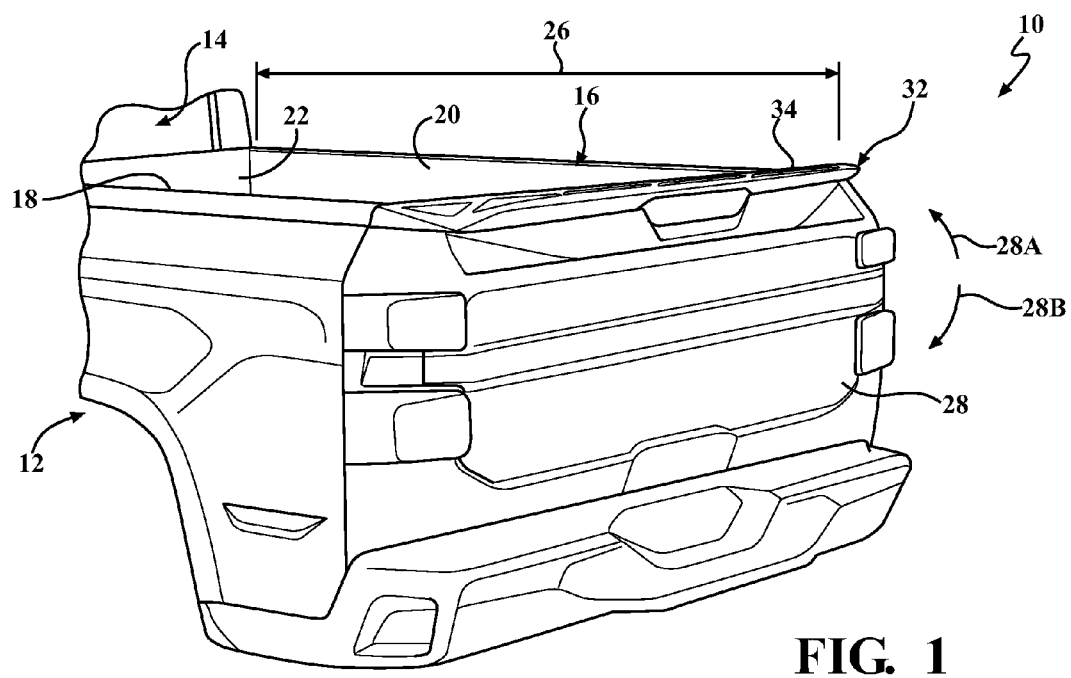
FIG. 1 is a schematic partial rear perspective view of a vehicle having a storage compartment that includes a multi-purpose tailgate, illustrating the tailgate in a closed state and a pivotable section retracted into the multi-purpose tailgate.
Figure 2:
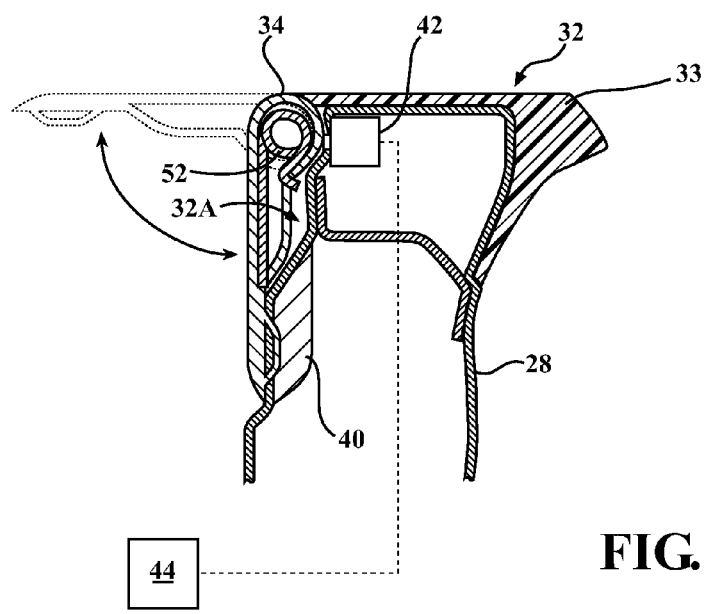
FIG. 2 is a schematic cross-sectional side view of the tailgate according to the embodiment shown in FIG. 1, illustrating the tailgate in the closed state and articulation of the pivotable section between retracted and deployed positions.

Referring to the drawings, wherein like reference numbers refer to like components, FIGS. 1 and 2 illustrate a motor vehicle 10 that is depicted as a pickup truck. The vehicle 10 includes a vehicle body 12. The vehicle body 12 defines a passenger compartment 14 and a storage or cargo compartment 16. As shown, the passenger compartment 14 is a pickup truck cab, while the storage compartment 16 is configured as a bed of a pickup truck and is generally adapted to carry bulky cargo. Although not shown, generally the vehicle body 12 of such a motor vehicle also includes a powertrain compartment for housing such sub-systems as engine, electric motor(s), and transmission.

As shown, the storage compartment 16 is enclosed on four sides but, as shown, may be arranged without a top cover, and therefore remain unrestricted from above. The storage compartment 16 includes a plurality of generally vertical perimeter walls, shown as a left sidewall 18, a right sidewall 20, and a front wall 22. The storage compartment 16 also includes a floor 24 (shown in FIG. 3). The left sidewall 18 and the right sidewall 20 each have a substantially equivalent length 26. The storage compartment 16 also includes a multi-purpose tailgate 28. As shown in FIG. 1, the tailgate 28 is operatively connected to the vehicle body 12 to selectively restrict access to the storage compartment by being closed, as identified by arrow 28A, and expand access to the storage compartment 16 by being opened, as identified by arrow 28B.

As understood by those skilled in the art, the tailgate 28 may be pivotably connected to the sidewalls 18 and 20 via a hinge mechanism 30. Alternatively, the tailgate 28 may alternatively be pivotably connected to the floor 24 via bearings. The walls 18, 20, 22, the floor 24, and the tailgate 28 are together configured to at least partially define the functional, i.e., cargo-carrying, area of the storage compartment 16. As shown in FIGS. 1 and 2, when the tailgate 28 is closed, the length of the storage compartment 16 is coextensive with the length 26 of the sidewalls 18, 20. Typically, a panel structure of the storage compartment 16—the walls 18, 20, and 22, the floor 24, and the tailgate 28—is formed from a suitably impact- and weather-resistant load-carrying material, such as a specifically engineered composite, aluminum, or steel.

As shown, the tailgate 28 may include a separate panel 32. The panel 32 may be fixed to the tailgate by any known means, such as snaps, screws, etc. As shown in FIG. 2, the panel 32 may be configured as an exterior trim component that includes a portion 33 for protecting the tailgate 28 from scuffs and dents when various cargo is loaded into or unloaded from the storage compartment 16. As shown, the panel 32 includes a pivotable section 34 configured to selectively retract into the panel and deploy or extend out of the panel. To facilitate stowage of the pivotable section 34 following its retraction, the panel 32 may define a first recess 32A configured to accept the pivotable section, such that the pivotable section 34 may fold into the panel, as shown in FIG. 2. The first recess 32A may have a contour configured to accept the pivotable section 34 such that, when the pivotable section is retracted, the pivotable section lays flush with the tailgate 28. In an embodiment shown in FIGS. 1 and 2, the pivotable section 34 in the retracted state may be substantially perpendicular to the floor 24 when the tailgate 28 is closed. In another embodiment shown in FIGS. 3 and 4, the pivotable section 34 in the retracted state may be substantially parallel to the floor 24 when the tailgate 28 is closed. In each of the above embodiments, the pivotable section 34 may be articulated to extend out of the panel 32 as disclosed in detail below.

Figure 3:
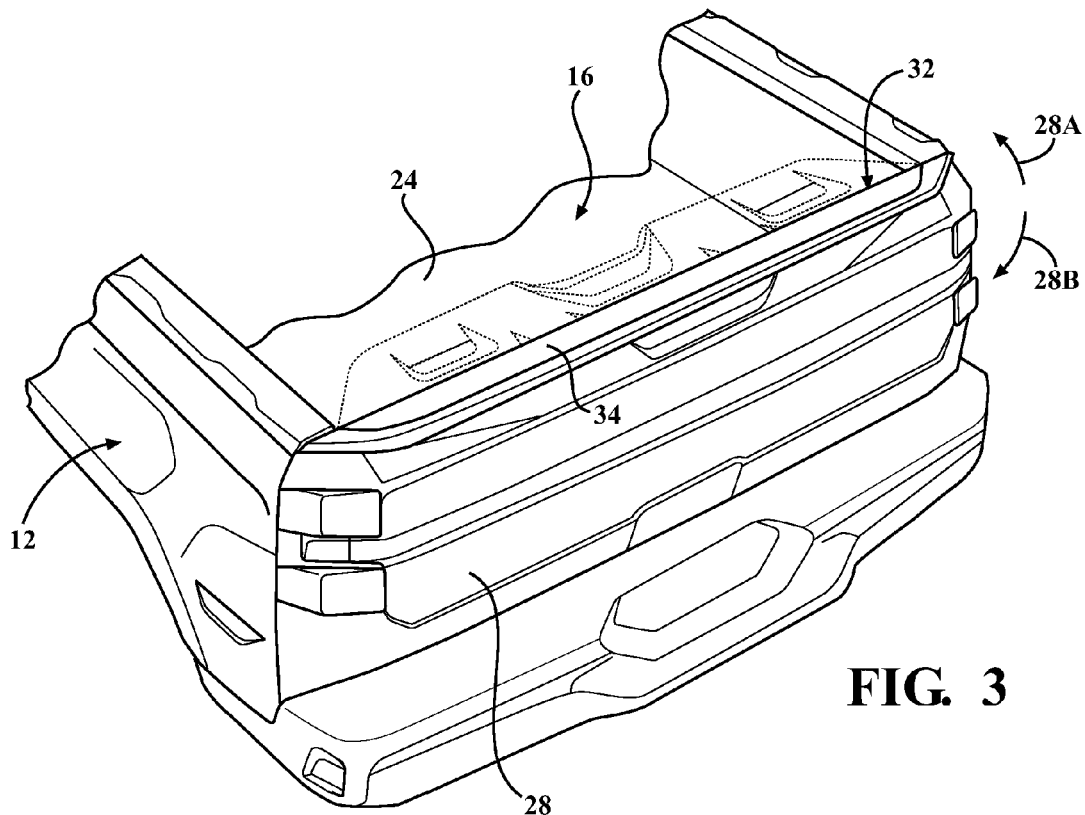
FIG. 3 is a schematic partial rear perspective view of the vehicle, illustrating the multi-purpose tailgate in the closed state and a pivotable section retracted into the tailgate according to an alternative embodiment.
Figure 4:
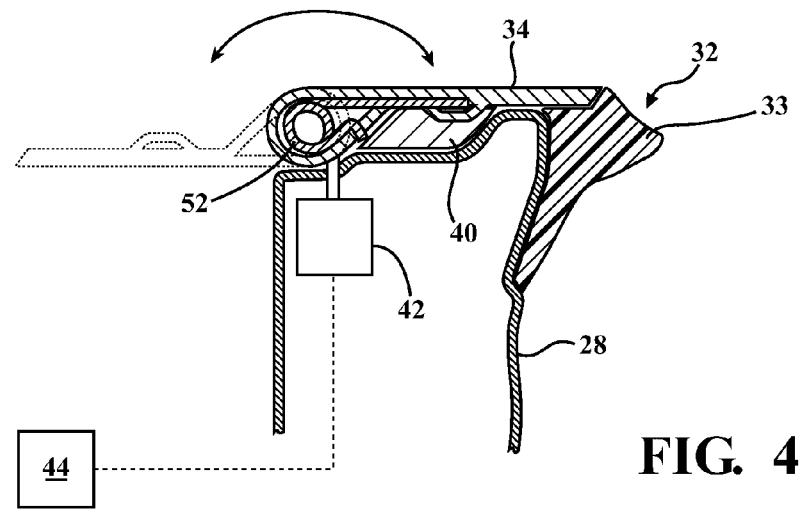
FIG. 4 is a schematic cross-sectional side view of the tailgate shown in FIG. 3, illustrating the multi-purpose tailgate in the closed state and articulation of the pivotable section between retracted and deployed positions.
Figure 5:
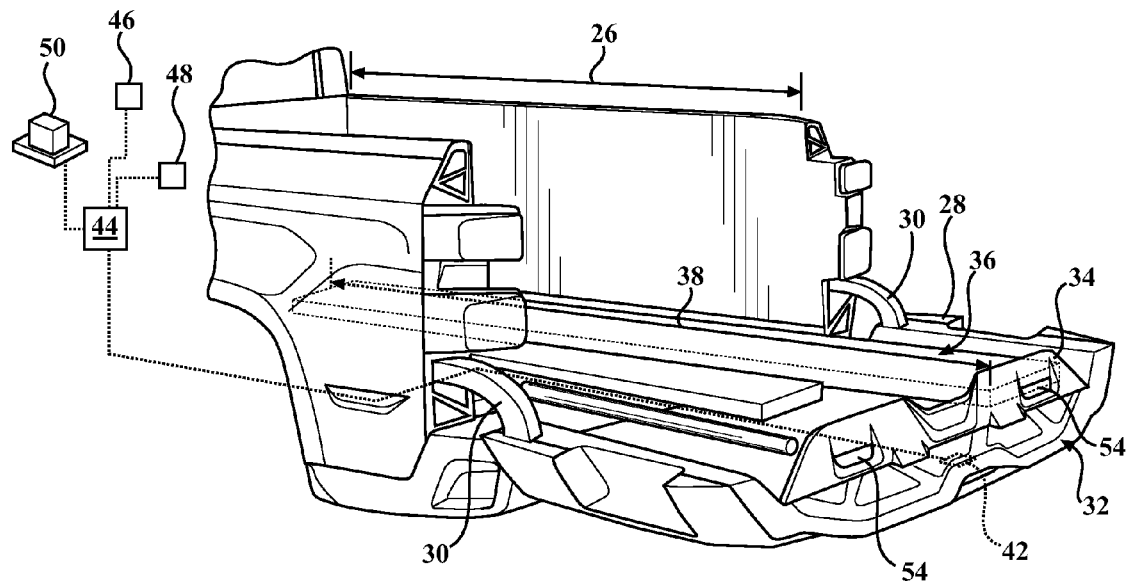
FIG. 5 is a schematic partial rear perspective view of the vehicle shown in each of FIGS. 1 and 3, illustrating the multi-purpose tailgate in an open state and the pivotable section in a deployed position.

In each of the respective embodiments of FIGS. 1-2 and 3-4, when the tailgate 28 is closed to restrict access to the storage compartment 16, and the pivotable section 34 is deployed out of the panel 32, the pivotable section is configured, i.e., shaped and positioned, as an aerodynamic aid that reduces aerodynamic drag on the vehicle body 12 (as shown in FIGS. 2 and 4). In the above-described mode, the deployed pivotable section 34 reduces aerodynamic drag on the vehicle body 12 by attaching a high-velocity laminar airflow from the pickup cab to the pickup bed when the truck operates at elevated road speeds. When the tailgate 28 is opened to expand access to the storage compartment 16, and the pivotable section 34 is deployed out of the panel 32, the pivotable section is intended to provide a positive stop for cargo 36, such as sections of lumber. Thus deployed, the pivotable section 34 is configured, i.e., shaped and positioned, to block the cargo 36 having a cargo length 38 greater than the storage compartment length 26 (as shown in FIG. 5) from sliding out of the storage compartment 16. Each of the panel 32 and the pivotable section 34 may be constructed from a material having appropriate combination of strength, durability, mass, and weather resistance, such as a specifically engineered plastic, composite, or fiberglass, or a metal, like aluminum or steel.

As shown in FIGS. 2 and 4, a latching mechanism 40 may be mounted on the tailgate 28 and configured to secure the pivotable section 34 either to the panel 32 or directly to the tailgate structure when the pivotable section is retracted into the panel. An electric motor 42 may be mounted on the tailgate 28 and configured to selectively retract the pivotable section 34 into and deploy the pivotable section out of the panel 32. The vehicle 10 may also include a controller 44. The controller 44 includes a memory that is tangible and non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 44 may also include a floppy disk, a flexible disk, hard disk, magnetic tape, any other magnetic medium, a CD-ROM, DVD, any other optical medium, etc. The controller 44 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 44 or accessible thereby may be stored in the memory and automatically executed to provide the required functionality.

The controller 44 may be arranged in the powertrain compartment, as discussed above, and configured to selectively latch and unlatch the latching mechanism 40 and regulate the motor 42 to selectively retract the pivotable section 34 into and deploy the pivotable section out of the panel 32 (as shown in FIGS. 2 and 4). The vehicle 10 may also include a first sensor 46 configured to detect, i.e., measure or otherwise determine, a road speed of the vehicle. Additionally, the vehicle 10 may include a second sensor 48 configured to detect a position of the tailgate 28, i.e., whether the tailgate is open or closed. The controller 44 is configured to communicate with each of the first and second sensors 46, 48 and selectively latch and unlatch the latching mechanism 40 and regulate the motor 42 in response to the detected vehicle speed and the detected position of the tailgate 28.

As shown in FIGS. 1 and 3, the vehicle 10 may additionally include a switch 50 configured to release or unlatch the latching mechanism 40 and thereby deploy the pivotable section 34 out of the panel 32. The switch 50 may be positioned in the passenger compartment 14 such that an operator of the vehicle 10 can manually release the latching mechanism 40 and deploy the pivotable section 34. As shown in FIGS. 2 and 4, a spring 52 may be employed for urging, e.g., biasing or moving, the pivotable section 34 to deploy out of the panel 32. The spring 52 may be arranged on the panel 32 or directly on the tailgate 28. As shown in FIG. 5, the pivotable section 34 may include one or more reflectors 54 configured to reflect a beam of light, such as from headlights of other vehicles trailing the vehicle 10. The reflector(s) 54 may, therefore, signal to operators of such other vehicles that the tailgate 28 is open and extends beyond the standard perimeter of the vehicle body 12. Accordingly, the reflector(s) 54 is intended to alert operators of other vehicles that cargo having length 38, which is greater than the storage compartment length 26, is onboard the vehicle 10.

Figure 6:
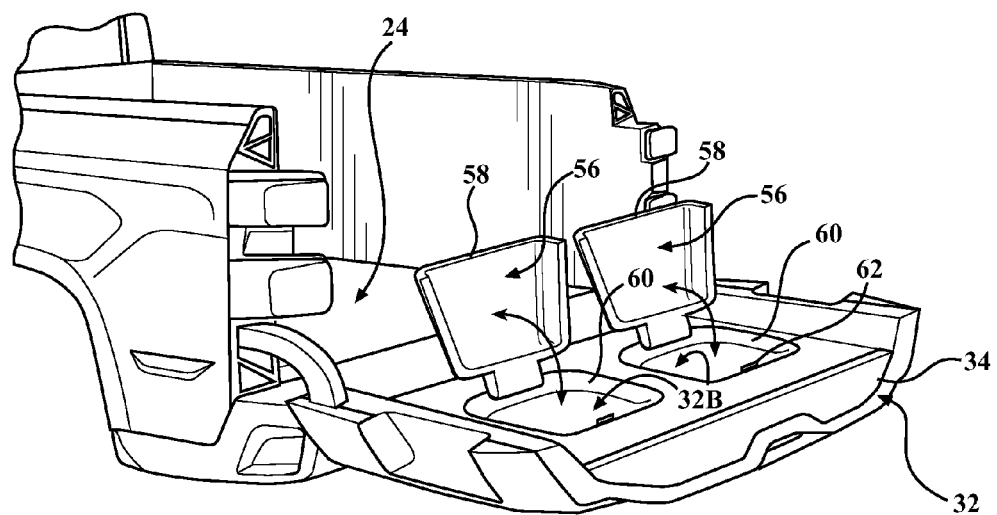
FIG. 6 is a schematic partial rear perspective view of the vehicle shown in FIGS. 3 and 4, illustrating the multi-purpose tailgate in an open state, the pivotable section retracted into the tailgate, and articulation of deployable seats between retracted and deployed positions.

As shown in FIG. 6, the storage compartment 16 may also include one or more deployable seats 56, which can be used as stadium seats. As shown, a selectively deployable and retractable seatback 58 is mounted pivotably, such as via hinges (not shown), to the panel 32, while the panel includes a seat bottom 60 complementary to the seatback. A second recess 32B may be formed or otherwise defined by the panel 32, and further define the shape of the seat bottom 60. Accordingly, the seat bottom 60 formed into the second recess 32B is configured, i.e., contoured, as a pocket to accept occupants of various shapes and sizes. The second recess 32B is also configured to house the seatback 58 when the seatback is retracted. When the tailgate 28 is open, the seats 56 may be deployed and retracted on demand, such as for tailgating at sporting and other social events. Each seatback 58 may be constructed from a specifically engineered plastic, composite, or fiberglass, or a metal, like aluminum or steel.

Although the seats 56 are depicted together with the embodiment of the pivotable section 34 shown in FIGS. 3-4, the deployable seats can likewise be used with the embodiment of the pivotable section shown in FIGS. 1-2. The panel 32 may include a mechanism 62 configured to selectively latch the seatback 58 to and release the seatback from the panel. Additionally, the controller 44 may be programmed to block deployment of the seats 56 when the first sensor 46 detects a non-zero road speed of the vehicle 10. Accordingly, as disclosed, the multi-purpose tailgate 28 includes features that can selectively operate as an aerodynamic aid, a positive cargo stop, and provide on-demand deployable seats at the bed of a pickup truck.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
a vehicle body;
a storage compartment defined by the vehicle body and having a storage compartment length;
a tailgate operatively connected to the vehicle body and configured to selectively expand and restrict access to the storage compartment; and
a pivotable section configured to selectively retract into and deploy out of the tailgate;
a motor configured to selectively retract the pivotable section into and deploy the pivotable section out of the tailgate;
wherein, when the pivotable section is deployed out of the tailgate, the pivotable section is configured to reduce aerodynamic drag on the vehicle body when the tailgate restricts access to the storage compartment, and configured as a stop for cargo having a cargo length greater than the storage compartment length when the tailgate expands access to the storage compartment.

2. The vehicle of claim 1, further comprising a latching mechanism configured to secure the pivotable section when the pivotable section is retracted into the tailgate.

3. The vehicle of claim 2, further comprising a controller configured to selectively latch and unlatch the latching mechanism and regulate the motor to selectively retract the pivotable section into and deploy the pivotable section out of the tailgate.

4. The vehicle of claim 3, further comprising a first sensor configured to detect a speed of the vehicle and a second sensor configured to detect a position of the tailgate, wherein each of the first and second sensors is configured to communicate with the controller, and wherein the controller is configured to selectively latch and unlatch the latching mechanism and regulate the motor in response to the detected vehicle speed and the detected position of the tailgate.

5. The vehicle of claim 2, further comprising a switch configured to unlatch the latching mechanism to thereby deploy the pivotable section out of the tailgate.

6. The vehicle of claim 5, further comprising a spring configured to urge the pivotable section to deploy out of the tailgate.

7. The vehicle of claim 1, wherein the tailgate defines a first recess configured to accept the pivotable section when the pivotable section is retracted into the tailgate.

8. The vehicle of claim 1, wherein the pivotable section includes a reflector configured to reflect a beam of light.

9. The vehicle of claim 1, wherein the tailgate includes a selectively deployable and retractable seatback and defines a second recess configured to house the seatback when the seatback is retracted.

10. The vehicle of claim 9, wherein the second recess defines a shape of a seat bottom.

11. The vehicle of claim 10, wherein each of the pivotable section and the selectively deployable and retractable seatback is constructed from one of a plastic and a composite material.

12. A vehicle comprising:
a vehicle body;
a storage compartment defined by the vehicle body and having a storage compartment length;
a tailgate operatively connected to the vehicle body and configured to selectively expand and restrict access to the storage compartment;
a pivotable section configured to selectively retract into and deploy out of the tailgate;
a motor configured to selectively retract the pivotable section into and deploy the pivotable section out of the tailgate;
a latching mechanism configured to secure the pivotable section when the pivotable section is retracted into the tailgate; and
a controller configured to selectively latch and unlatch the latching mechanism and regulate the motor to selectively retract the pivotable section into and deploy the pivotable section out of the tailgate;

wherein, when the pivotable section is deployed out of the tailgate, the pivotable section is configured to reduce aerodynamic drag on the vehicle body when the tailgate restricts access to the storage compartment, and configured as a stop for cargo having a cargo length greater than the storage compartment length when the tailgate expands access to the storage compartment; and wherein the vehicle body is positioned in a first plane, when the tailgate restricts access to the storage compartment, the tailgate is positioned in a second plane that is perpendicular to the first plane, and, when the pivotable section is deployed out of the tailgate, the pivotable section is positioned in a third plane that is parallel to the first plane.

13. The vehicle of claim 12, further comprising a first sensor configured to detect a speed of the vehicle and a second sensor configured to detect a position of the tailgate, wherein each of the first and second sensors is configured to communicate with the controller, and wherein the controller is configured to selectively latch and unlatch the latching mechanism and regulate the motor in response to the detected vehicle speed and the detected position of the tailgate.

14. The vehicle of claim 12, wherein the tailgate defines a first recess configured to accept the pivotable section when the pivotable section is retracted into the tailgate.

15. The vehicle of claim 12, wherein the pivotable section includes a reflector configured to reflect a beam of light.

16. The vehicle of claim 12, wherein the tailgate includes a selectively deployable and retractable seatback and defines a second recess configured to house the seatback when the seatback is retracted.

17. The vehicle of claim 16, wherein the second recess defines a shape of a seat bottom.

18. The vehicle of claim 17, wherein each of the pivotable section and the selectively deployable and retractable seatback is constructed from one of a plastic and a composite material.

* * * * *